United States Patent
Arnemann

[15] 3,651,962
[45] Mar. 28, 1972

[54] APPARATUS FOR LOADING SACKS ONTO PALLETS

[72] Inventor: Gerhard Arnemann, Pinneberg, Germany

[73] Assignee: Fordertechnik Hamburg Harry Lassig, Muhlendamm, Germany

[22] Filed: July 2, 1970

[21] Appl. No.: 51,975

[52] U.S. Cl. .................................................. 214/6 DK
[51] Int. Cl. ....................................................... B65g 57/10
[58] Field of Search .................. 214/6 PK, 6 P, 6 H, 6.5

[56] References Cited

UNITED STATES PATENTS

| 3,059,787 | 10/1962 | Forsyth | 214/6 P |
| 3,164,080 | 1/1965 | Miller, Jr. | 214/6 P X |
| 3,429,459 | 2/1969 | Paul et al. | 214/6 P |
| 3,567,046 | 3/1971 | Reist | 214/6 DK |

Primary Examiner—Gerald M. Forlenza
Assistant Examiner—Robert J. Spar
Attorney—McGlew and Toren

[57] ABSTRACT

An apparatus for loading sacks onto pallets, comprising conveyor means, sack positioning and flattening devices, sack transfer devices, a retaining bar, a packing plate for forming sack layers, transferring the sack layers onto a pallet, applying an antiskid agent between the sack layers and shaping the sack layers deposited on the pallet, and a lifting platform for the pallets.

5 Claims, 10 Drawing Figures

Inventor:
GERHARD ARNEMANN

Inventor:
GERHARD ARNEMANN
By McGlew and Toren
ATTORNEYS

APPARATUS FOR LOADING SACKS ONTO PALLETS

DESCRIPTION OF THE INVENTION

For loading sacks onto pallets automatic apparatus have become known in which the sacks are rotated in accordance with their sizes and shapes and are then deposited in layers onto a pallet. By means of these known loading apparatus it is not possible to obtain stacks of sacks which—even when the sacks are stacked in a binding—have a sufficiently high stability so that a safe transport of the sacks stacked on the pallet and a piling up of several pallets holding a stack of sacks each cannot be ensured. As has been shown, the preformed layer of sacks gets shifted, during the withdrawal of the packing plate, in the withdrawal direction of the packing plate and is thereby pushed against a stripper, with the result that the contents of the sack at this lateral stop are compressed and the sack is bulging outwardly in this region. Concurrently the stacking edge is precisely shaped only at the side facing the withdrawal direction of the packing plate. All existing unevenness will then show at the opposite side of the stack. This renders the formation of stable consolidated stacks more difficult.

It is therefore a principal object of the present invention to provide an apparatus for loading sacks onto pallets in the form of a stable binding whereby the stacking is independent from the particular binding arrangement used. It is another object of the invention to load the sacks onto a pallet in the form of a stable stack allowing to transport the stack at relatively high speeds around narrow bends and to pile up several pallets supporting several layers of sacks each without the risk of a deformation of the almost rectangular bindings of the sacks.

For achieving these objects the invention proposes an apparatus for loading sacks onto pallets wherein the sacks are transferred by means of a conveyor belt and a transfer bar movable perpendicularly to the feed direction onto a packing plate parallel to the conveyor belt and serving as a transfer means, and the sacks are transferred from the packing plate onto a pallet which is placed on a platform adapted to be raised or lowered, and the platform for receiving the pallets is lifted upwardly against a movable packing plate after the deposition of a layer of sacks onto the pallet or onto one layer or several layers of sacks already deposited on the pallet. This apparatus is characterized, according to the present invention, in that the movable packing plate is curved outwardly at its lower surface having a curvature such that the thickness of the packing plate increases from its edges towards its center, a retaining bar provided at a side of the packing plate opposite to the direction of withdrawal of the plate and adjacent to an outer edge of the sacks in the stack, the retaining bar being adapted to be urged against an uppermost layer of sacks during the withdrawal of the packing plate, and the packing plate comprises in its front face several discharge nozzles of a sack layer spraying device connected by flexible hoses through a feeding device to a reservoir for an antiskid spray liquid arranged at a base frame of the apparatus.

The automatic loading apparatus of the invention which comprises a retaining bar adapted to be urged against a row of sacks in a layer of sacks which row is disposed on the side opposite to the withdrawal direction of the packing plate, and a packing plate the lower surface of which is curved conically outwardly allows to form stacks of sacks which have an inherent stability and precisely defined outer edges. Stacks of sacks which have been formed by means of the loading apparatus of the present invention may be easily transported without the risk of disintegration of the stack. The formation of a precisely defined stack of sacks entails the further advantage that several loaded pallets may be piled up on each other. Since the loading apparatus according to the invention is provided with a device for spraying the sack layers with a liquid which is arranged at the front face of the packing plate no mist is developed in the ambient atmosphere because the two sack layers between which the packing plate is disposed define an enclosed space which prevents a lateral escape of the sprayed antiskid agent. Besides, the spray liquid is applied to the surface of the layer of sacks which is disposed below the packing plate and also to the lower surface of the upper layer of sacks when withdrawing the packing plate thus leading to a very high stability of the stack which is formed on the pallet.

The foregoing and other objects and the advantages of the present invention will appear from the following detailed description of a preferred illustrative embodiment thereof, taken in connection with the accompanying drawings in which.

Figure 1:
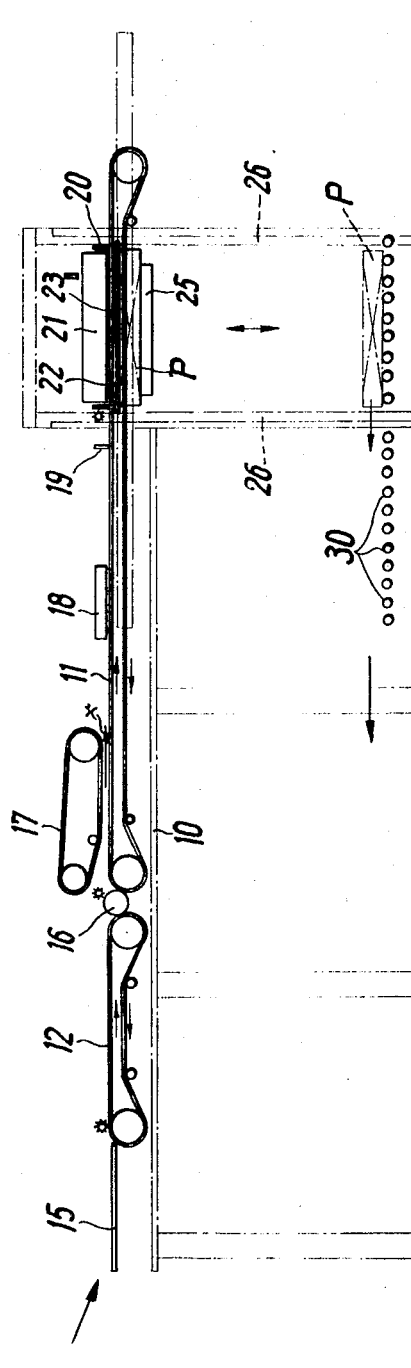
FIG. 1 is a schematical lateral elevational view of an automatic apparatus for loading sacks onto pallets.
Figure 2:
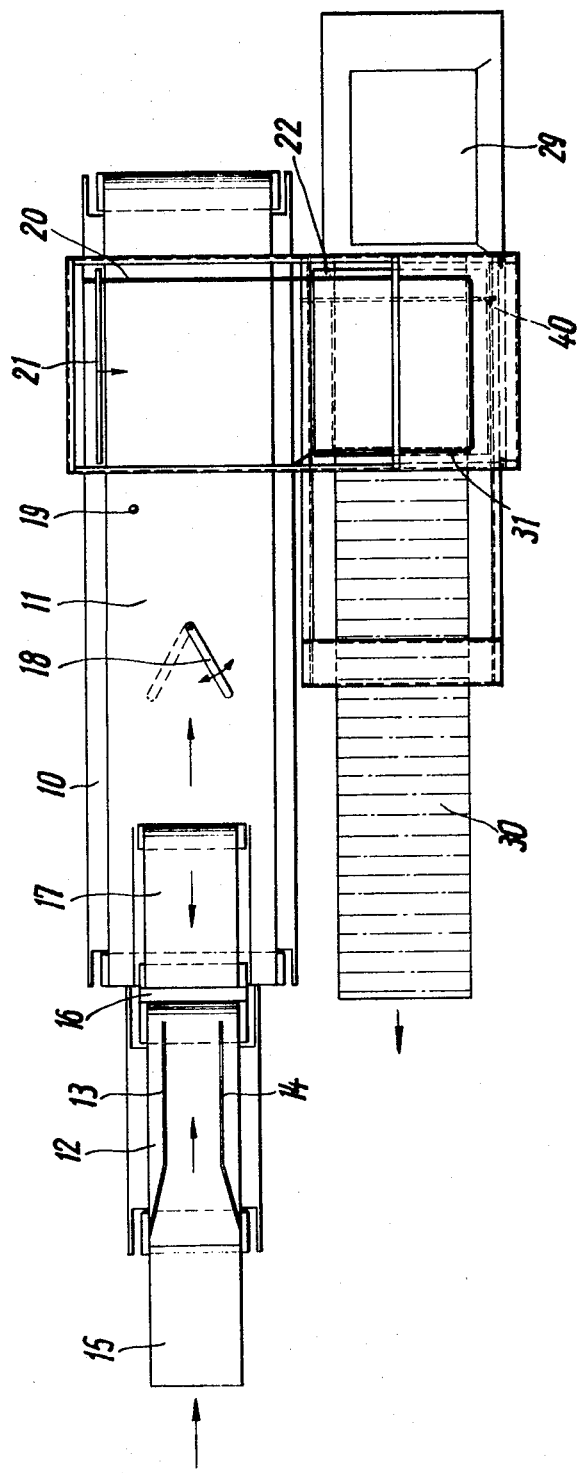
FIG. 2 is a top plan view of the apparatus of FIG. 1.

Referring to FIGS. 1 and 2, the apparatus for loading sacks onto pallets comprises a base frame 10 in which is arranged a continuous conveyor belt 11 and a further conveyor belt 12 in advance of the conveyor belt 11. Mutually spaced guide ledges 13 and 14 are arranged above the conveyor belt 12 the ends of which facing the feed side are flaring or bent outwardly. The spacing of the two guide ledges is somewhat wider than the width of a sack. This spacing is however adjustable. The sacks are aligned by means of the conveyor belt 11 and the guide ledges 13, 14.

A vibrating table 15 is provided on the upstream side of the aligning conveyor belt 12 and serves to uniformly distribute the contents in the sacks. A device for flattening the sacks is arranged at the feed end and spaced above the conveyor belt 11, this device comprising a continuous conveyor belt 17 the direction of rotation of which is such that sacks between the two conveyor belts are moved in the direction of the arrow $x$. By means of a feed roller 16 which is controlled by an electronic control the sacks are then fed to the conveyor belt 11 which transports the sacks into a region from which the sacks are transferred onto the pallets. In this manner a sack transfer onto other conveyor belts or roller tracks is avoided so that the sacks having a flattened horizontal surface are conveyed in a continuous plane. By means of a plate-shaped rotatable guide 18 and a positioning pin 19 above the conveyor belt 11 the sacks are rotated into the required position for forming a stack binding. The sacks then enter a space bordered by a rear stop bar 20 which extends parallel to the axis of the return roller of the conveyor belt 11. In this space the sacks are made available for the transfer onto the pallets.

A transfer bar 21 is provided parallel to the direction of movement of the conveyor belt 11 and serves to transfer a layer of sacks onto a packing plate 22 which is disposed in the same plane as the conveyor belt 11 and above the pallet P. The size of the packing plate 22 approximately corresponds to the loading zone of the pallet. Preferably the packing plate 22 has a small thickness and is movable parallel to the direction of movement of the conveyor belt 11. The lower surface of the packing plate 22 is curved outwardly so that the thickness of the packing plate increases from its edges towards its center. This curved surface is indicated by the reference numeral 23

Figure 4:
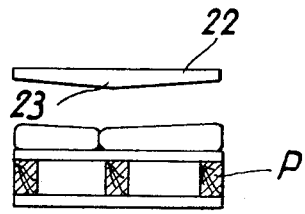
FIG. 4 is a lateral view of a layer of sacks formed by the packing plate.
Figure 8A:
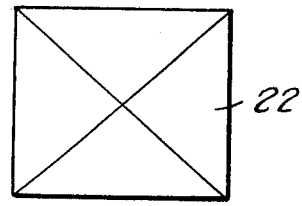
FIG. 8a is a bottom view of a pyramidally shaped packing plate.

(FIG. 4). The lower surface of the packing plate 22 preferably has the form of a saddle roof (FIG. 4), however also other types of curvatures such as a pyramidal curvature may be provided.

Figure 3:
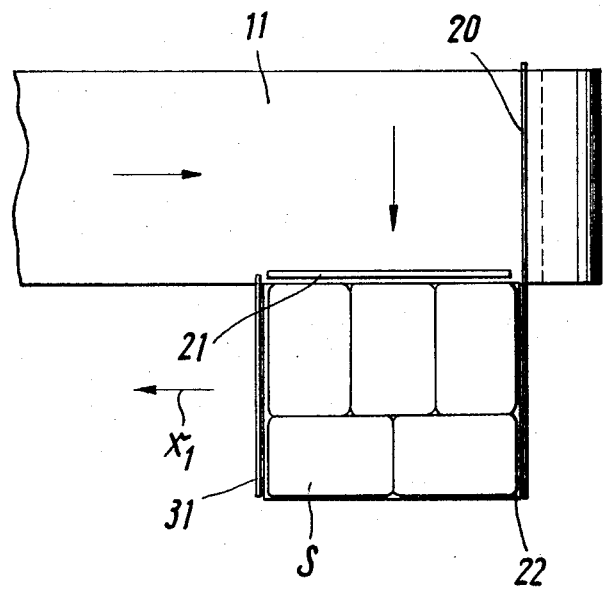
FIG. 3 is a fragmentary view of the conveyor belt, after the transfer of a layer of sacks onto the packing plate.

The unloaded pallet P is placed on a platform 25 which may be raised and lowered and is guided for this movement in lateral guides 26 of the base frame 10. The whole arrangement is such that through the withdrawal of the packing plate 22 below the layer of sacks S (FIG. 3) the sacks will be transferred onto the pallet P without undergoing any substantial deformation. After loading the lifting platform 25 together with the pallet P is lowered by a distance corresponding to the height of one layer of sacks thus clearing the space for the next following layer of sacks and allowing to return the packing plate 22 into its loading position. For obtaining a tighter stacking, every layer of sacks on the pallet P is again lifted upwardly by an upward movement of the pallet P with the layers of sacks already deposited thereon until the surface of the uppermost layer of sacks engages the lower surface of the packing plate 22 which has been returned into its loading position, and so the sack surfaces are urged against this lower plate surface until the packing plate 22 is again withdrawn.

The full pallet is then pushed by an empty pallet taken from a stack of pallets 29 arranged by the side of the lifting platform 25 (FIG. 2) onto a roller track 30 from which the pallets are removed for further handling and transportation. After the removal of the loaded pallet the new empty pallet is moved by means of the lifting platform 25 into the upper loading position. In the meantime a new packing layer has been prepared which may now immediately be transferred from the packing plate 22 onto the empty pallet.

Figure 5:
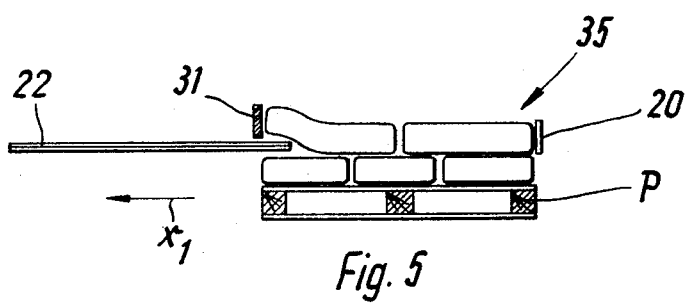
FIG. 5 is a lateral view of two layers of sacks during the withdrawal of the packing plate.

Since the pre-arranged layer of sacks S is shifted slightly in the withdrawal direction $x_1$ when withdrawing the packing plate 22 in the direction of the arrow $x_1$ (FIG. 3) the contents of the sack are compressed at the lateral limit bar 31 so that only the stacking edge at the side of the withdrawal direction $x_1$ is preserved intact whereas at the opposite side 35 unevenness may develop (FIG. 5).

Figure 6:
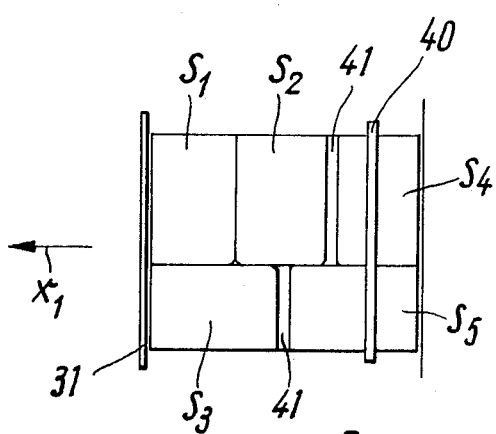
FIG. 6 is a top view of a layer of sacks during the withdrawal of the packing plate and the simultaneous application of the retaining bar onto the row of sacks opposite to the withdrawal direction of the packing plate.
Figure 7:
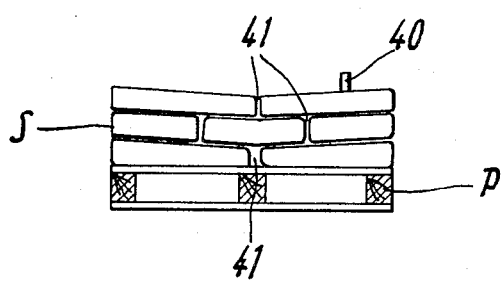
FIG. 7 is a lateral view of three layers of sacks and a retaining bar applied to the uppermost layer of sacks.

In order to obtain a precisely defined positioning of the sacks and nearly rectangular stacking edges the invention provides a retaining bar 40 which may be placed on that row of sacks which is opposite to the withdrawal direction of the packing plate (FIGS. 1, 2, 6 and 7). When the packing plate 22 is withdrawn in the direction $x_1$ for transferring the layer of sacks onto the pallet P only the sacks $S_1$, $S_2$, $S_3$ which are not retained by the retaining bar 40 advance toward the stop bar 31 whereas the retained sacks $S_4$, $S_5$ remain in their initial positions. This leads to a slot-shaped clearance gap 41 between the retained sacks $S_4$, $S_5$ and the sacks $S_2$, $S_3$ of the three sacks $S_1$, $S_2$, $S_3$ which have been shifted. Therefore the sacks of this layer adapt their shapes to the conically recessed or withdrawn surfaces of the layers of sacks which are already arranged on the pallet and have been formed by means of the curvature 23 of the packing plate 22 (FIGS. 6 and 7). It is likewise possible to shape only the surface of the first layer of sacks by means of the packing plate 22. Then all following sack layers will adapt their shapes to this surface shape. Preferably the pallet is pressed upwardly together with every freshly formed sack layer against the outwardly curved lower surface of the packing plate 22 by raising the lifting platform 25. The surface of every sack layer will be more or less deformed into the shape of the lower surface curvature 23 of the packing plate 22 whereby the degree of deformation in each case depends upon the degree of filling of the sacks and the compressibility of the sack contents. Due to this surface formation the stack of sacks is withdrawn or recessed towards its center, providing the stack with a high stability. Since a gap 41 is formed between the sacks of one layer of sacks the sack contents will adapt themselves to the shape of the curvature 23 of the lower surface of the packing plate 22 when the sacks are pressed against this surface. Furthermore the outer edges of the individual sack layers which have been preformed during the formation of the layer on the packing plate 22 will also be retained after transfer of the sack layers onto the pallet. Every stack of sacks is well formed and provided with exactly defined outer edges.

The movements of the packing plate 22 and the retaining bar 40 are preferably coupled so that after applying the retaining bar onto the sack layer the packing plate is withdrawn. Subsequently the pallet is lowered by the height of the last deposited sack layer through the lifting platform. Simultaneously the packing plate is returned into its loading position. While a new layer of sacks which has been prepared in the meantime is transferred by means of the transfer bar onto the packing plate the lifting platform together with the pallet is lifted so that the upper sack layer is pressed against the outwardly curved lower surface of the packing plate and the surface of the sack layer is correspondingly shaped. Then the packing plate is withdrawn and the new sack layer shifted onto the pallet.

Figure 8:
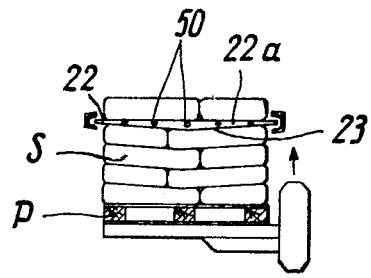
FIG. 8 shows a lateral view of the packing plate with the discharge nozzles for the antiskid agent arranged in its front face.
Figure 9:
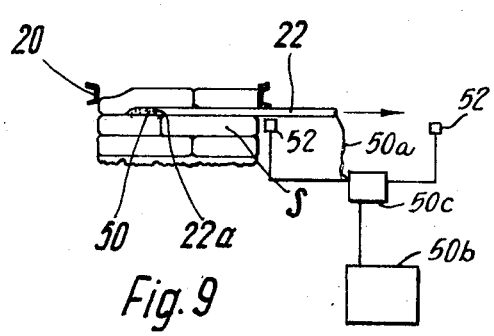
FIG. 9 shows a lateral view of several layers of sacks during the withdrawal of the packing plate and the spraying operation.

For applying a spray liquid of a conventional antiskid agent such as an adhesive the packing plate 22 is provided at its front face 22a which is opposite to the withdrawal direction of the packing plate with several discharge nozzles 50 of a sack layer spraying device (FIGS. 8 and 9). These discharge nozzles 50 may be connected by hoses 50a to a reservoir 50b for the antiskid agent spray liquid through a feed device 50c such as a pump of the positive displacement type. The reservoir for the spray liquid may be arranged on the base frame 10 of the apparatus. In an alternate embodiment, the packing plate 22 may be double walled forming a container closed on all sides and adapted to receive the antiskid agent. The discharge nozzles 50 will then be arranged in the front face of the container. In the latter embodiment will also be provided a feeding device for ejecting the antiskid agent. This device may have the form of a small booster pump arranged within the packing plate or the form of a plunger which is kept stationary during the withdrawal of the packing plate 22 or is actuable in the opposite sense so that the antiskid agent will be forced out of the discharge nozzles 50. The plunger arrangement will be such that antiskid agent will also be discharged if the container holds only a small quantity of spray liquid. For introducing the spray liquid into the packing plate 22 the plate comprises a lateral filling tube or inlet which may be sealed.

The packing plate 22 is coupled to control members 52 adapted to actuate the spraying device during the withdrawal of the packing plate and to interrupt its operation upon termination of the withdrawal movement. The control may be effected by means of limit switches or the like or by means of mechanical devices such as control rods or the like. Therefore the movements of the packing plate 22 are coupled to the spraying device so that the latter will only be operated during withdrawal of the packing plate 22.

What is claimed is:

1. An apparatus for loading sacks onto pallets wherein the sacks are transferred by means of a conveyor belt and a transfer bar movable perpendicularly to the feed direction of the sacks onto a movable packing plate parallel to the conveyor belt and serving as a transfer means, and then the sacks are transferred from the packing plate onto a pallet which is placed on a platform adapted to be raised or lowered, and the platform for receiving the pallets is lifted upwardly against said movable packing plate after the deposition of a layer of sacks onto the pallet or after the deposition of a layer of sacks onto one layer or several layers of sacks already deposited on the pallet, said apparatus being characterized in that the movable packing plate is curved outwardly at its lower surface having a curvature such that the thickness of the packing plate increases from its edges towards its center, a retaining bar provided at a side of the packing plate opposite to the direction of withdrawal of the plate and adjacent to an outer edge of the stacked sacks, the retaining bar being adapted to be urged against an uppermost layer of sacks during withdrawal of the packing plate, and the packing plate comprises in its front face several discharge nozzles of a sack layer spraying device connected to a supply of an antiskid spray liquid.

2. An apparatus according to claim 1 characterized in that the movable packing plate is provided at its lower surface with an outward curvature having generally the form of a saddle roof, a retaining bar provided at a side of the packing plate opposite to the direction of withdrawal of the plate and adjacent to an outer edge of the stacked sacks, the retaining bar being adapted to be urged against an uppermost layer of sacks during withdrawal of the packing plate, and the packing plate comprises in its front face several discharge nozzles of a sack layer spraying device connected by a flexible hose means through a feeding device to a reservoir for an antiskid spray liquid arranged at a base frame of the apparatus.

3. An apparatus according to claim 1 characterized in that the movable packing plate is provided at its lower surface with an outward curvature of a generally pyramidal shape, a retaining bar provided at a side of the packing plate opposite to the direction of withdrawal of the plate and adjacent to an outer edge of the stacked sacks, the retaining bar being adapted to be urged against an uppermost layer of sacks during withdrawal of the packing plate, and the packing plate comprises in its front face several discharge nozzles of a sack layer spraying device connected by flexible hoses through a feeding device to a reservoir holding an antiskid spray liquid, the reservoir being arranged at a base frame of the apparatus.

4. An apparatus according to claim 1 characterized in that the movable packing plate is provided at its lower surface with an outward curvature such that the thickness of the packing plate increases from its edges towards its center, the packing plate being furthermore provided in the form of a double walled container for receiving the antiskid agent and including a plurality of discharge nozzles and a feed device for the antiskid agent, a retaining bar provided at a side of the packing plate opposite to the direction of withdrawal of the plate and adjacent to an outer edge of the stacked sacks, the retaining bar being adapted to be urged against an uppermost layer of sacks during the withdrawal of the packing plate, and that the packing plate comprises in its front face several discharge nozzles for the antiskid spray liquid.

5. An apparatus according to claim 1 characterized in that the movable packing plate is curved outwardly at its lower surface having a curvature such that the thickness of the packing plate increases from its edges towards its center, a retaining bar provided at a side of the packing plate opposite to the direction of withdrawal of the plate and adjacent to an outer edge of the stacked sacks, the retaining bar being adapted to be urged against an uppermost layer of sacks during the withdrawal of the packing plate, the packing plate comprises in its front face several discharge nozzles of a sack layer spraying device connected by flexible hoses through a feeding device to a reservoir for an antiskid spray liquid arranged at a base frame of the apparatus, and that the packing plate is coupled to the spraying device through control members adapted to be actuated when withdrawing the packing plate.

* * * * *

UNITED STATES PATENT OFFICE
CERTIFICATE OF CORRECTION

Patent No. 3,651,962          Dated March 28, 1972

Inventor(s) GERHARD ARNEMANN

It is certified that error appears in the above-identified patent and that said Letters Patent are hereby corrected as shown below:

In the heading of the patent, the following should be inserted:

-- [30] Foreign Application Priority Data
July 18, 1969 Germany.....P 19 36 554.9 --

Signed and sealed this 3rd day of April 1973.

(SEAL)
Attest:

EDWARD M. FLETCHER, JR.
Attesting Officer

ROBERT GOTTSCHALK
Commissioner of Patents